April 3, 1951        F. ZIHERL        2,547,428

MERCURY SEAL BUSHING

Filed Nov. 3, 1948

*INVENTOR.*
FRANK ZIHERL
BY William Isler
ATTORNEY.

Patented Apr. 3, 1951

2,547,428

UNITED STATES PATENT OFFICE 2,547,428

MERCURY SEAL BUSHING

Frank Ziherl, Euclid, Ohio, assignor to Z & W Machine Products, Inc., a corporation of Ohio Application November 3, 1948, Serial No. 58,120

2 Claims. (Cl. 286—9)

This invention relates to shaft bushings and more particularly to a novel form of sealing bushing in which a mercury barrier is employed.

In various forms of mixing and agitating apparatus, of the type in which a rotating or oscillating shaft extends upwardly into a liquid filled vat or tub, it is necessary that the opening through which the shaft extends be sealed against leakage of the liquid contents. In domestic laundering machines, for example, it is common practice to use a packing nut or a spring-pressed packing gland around the shaft in order to prevent fluid leakage. Such devices, of course, bear very tightly against the circumference of the shaft and as a result cause undue wear on the shaft. In addition, such devices create a substantial frictional resistance to movement of the shaft which makes it necessary that the electric motor or the like which drives the shaft be of larger size and capacity than would otherwise be required. Another undesirable characteristic of these devices is that they must be adjusted periodically to take up the wear on the shaft and the packing.

It is the primary object of my invention to provide a bushing which will be effective at all times to prevent the leakage of fluid past the shaft.

Another object of my invention is to provide a bushing which offers only a negligible amount of frictional resistance to the movement of the shaft.

A further object of my invention is to provide a bushing which will require no adjustment for continued effectiveness.

Still another object of my invention is to provide a bushing of the character described which is simple and inexpensive to manufacture.

Other objects and advantages of my invention will become apparent during the course of the following description.

In the drawings annexed hereto and forming a part hereof, and in which like numerals are used to designate like parts throughout the same, Fig. 1 is a front elevation of my invention as it appears when installed on a laundering machine, the quarter-section being taken on line 1—1 of Fig. 2.

Figure 1:
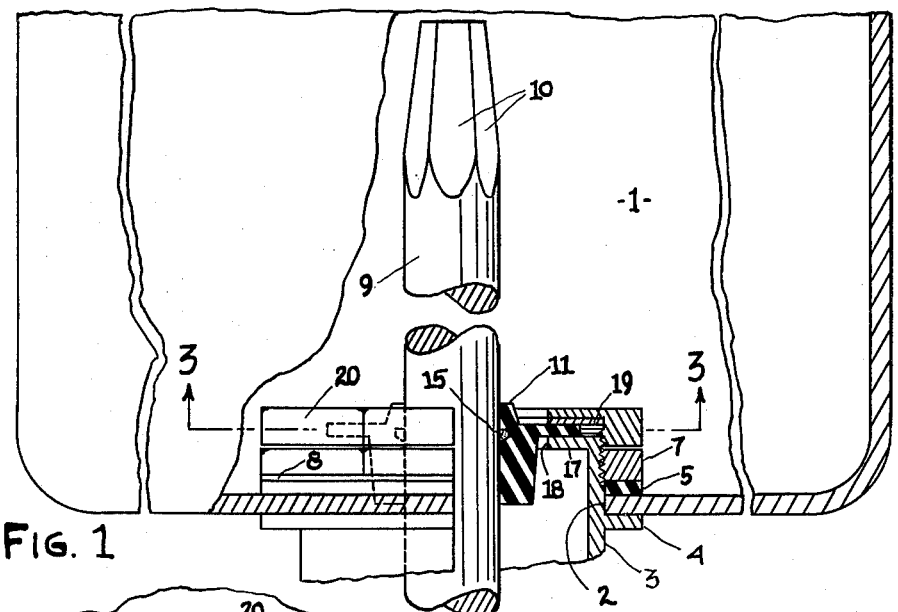
Figure 2:
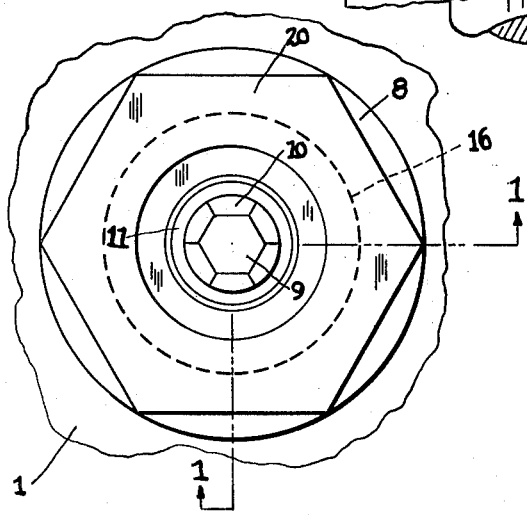
Fig. 2 is a fragmentary top plan view of the parts shown in Fig. 1.
Figure 3:
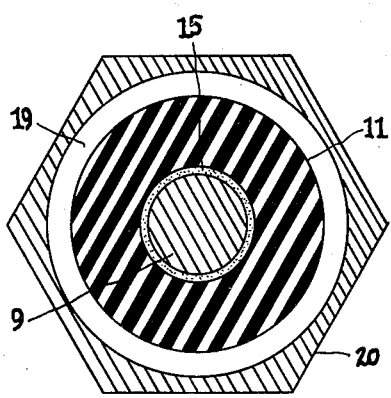
Fig. 3 is a cross-sectional view taken on line 3—3 of Fig. 1.

Referring more particularly to the drawings, in Fig. 1 I have shown a tub 1 of a laundering or washing machine of conventional design. The tub 1 is adapted to be filled with water and the articles to be laundered. An opening 2 is provided in the bottom of the tub through which extends an externally threaded sleeve member 3, the member 3 having a circumferential flange 4 which serves as a seat for the tub.

The opening 2 is sealed against fluid leakage by means of a circular rubber washer 5 which surrounds the sleeve member 3 and which is tightly pressed against the bottom of the tub by means of a nut 7 which is threadedly secured to the sleeve member 3. The nut 7 is provided with a flange portion 8 which is especially adapted to overlie the washer 5 and press firmly against it.

A shaft 9 extends upwardly through the hollow sleeve member 3, the upper end thereof being shaped to form a series of tapered flat surfaces 10. An agitator (not shown) is mounted on the upper end of the shaft and is engaged by the flats 10, this arrangement being well known in the art.

Figure 4:
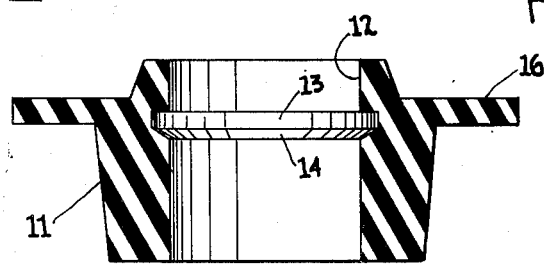
Fig. 4 is an enlarged cross-sectional detail of the bushing itself, being similar to the view shown in Fig. 1.

A molded bushing 11, preferably formed of a synthetic rubber, such, for example, as neoprene, is mounted slidably on the shaft 9. As best seen in Fig. 4, the bushing has a central bore 12 which is of approximately the same diameter as that of shaft 9 and the bore is grooved to provide an annular recess 13 having a tapered or inclined shoulder 14. In assembling the bushing with the shaft 9, the recess 13 is filled with a heavy liquid seal 15, and for this purpose I have found liquid mercury to be most practicable. The function of the mercury will be more fully described hereinafter.

The bushing 11 has formed thereon an outwardly extending circular flange 16 which overlies an internal flange 17 provided on the end of the sleeve member 3. The bushing is thus supported by the sleeve member 3 and the bushing serves to seal the opening 18 in the upper end of the sleeve member.

The flange 16 is compressed against the flange 17 by means of a circular metal washer 19 and a nut 20, thereby preventing any fluid leakage around the periphery of the bushing 11. It will be apparent that due to the resiliency of the bushing and the manner in which it is supported, the bushing 11 can readily adjust itself to out-of-line conditions of the shaft which may occur during operation of the machine.

Referring now particularly to the sealing function of the bushing, I will describe the function of the mercury in relation to the shaft. When the bushing 11 is initially mounted on the shaft 9, it does not contain the liquid seal 15. In order to fill the recess 13 with mercury, I have found it expedient to slide the bushing only part way down the shaft, to a point where the recess 13 is just above the lower port of the tapered flats 10. With the bushing in this position, I am able to add the small quantity of mercury required by dropping it between the shaft and the internal wall of the bushing until the recess 13 is filled. The bushing is then slid down the shaft and secured in the manner heretofore described.

The inclined shoulder 14 of the recess 13 causes the mercury to contact the shaft 9 at all times, even when the recess is only partially filled with the liquid 15. The shaft, if made of steel, is preferably chrome-plated so that there will be no amalgam formed by the shaft and the mercury.

The bushing 11 need not actually be in contact with the shaft 9 to make the seal effective. I have found that the seal is effective when the clearance between the shaft and bushing is on the order of .002 inch. The surface tension of the mercury is sufficiently great to prevent the mercury from flowing out between the shaft and the bushing. On the other hand, the specific gravity of the mercury is so much greater than that of water that the mercury will not be displaced by water and thereby no water is permitted to pass between the shaft and the bushing.

Inasmuch as mercury is a fairly expensive substance, it is advisable from the economic standpoint to use it sparingly. In this respect, I have found that the seal is completely effective if the recess 13 is so dimensioned as to contain as little as two drops of mercury.

It will thus be seen that a bushing embodying the features of my invention is highly effective to prevent the leakage or escape of fluids and is simple and inexpensive to produce. Of equal importance is the fact that the mercury seal bushing offers only a negligible amount of resistance to the turning movement of the shaft thereby permitting all the power of the motor to be expended in performing useful work rather than in overcoming the binding effect of the prior art bushings.

Although I have here described the specific application of my novel seal to a washing machine shaft, it will be understood that the principle of my invention is equally applicable to horizontal shafting. In the case of a horizontal installation, it would be necessary to provide a reservoir in the bushing for the mercury so that the recess would at all times be completely filled with the mercury. This could take the form of a channel extending radially from the recess to the periphery of the bushing. The channel would thus serve both as a reservoir of mercury and as a means of filling the recess. The open end of the channel could be suitably plugged after filling.

It is to be understood that the invention herein shown and described represents a preferred example of the same and that various changes in the shape, size and arrangement of the parts may be resorted to without departing from the spirit of my invention or the scope of the subjoined claims.

Having thus described my invention, I claim:

1. In combination, a vessel adapted to contain a fluid, a resilient bushing supported by said vessel, a shaft extending vertically through said bushing and adapted to be rotated relatively to said bushing, said bushing having a relatively narrow, shallow circumferential groove formed in the bore thereof and defined in part by a lower wall which slopes downwardly toward the shaft, and mercury disposed in said recess and bearing against said shaft to form a liquid seal between the shaft and bushing, said shaft being free from pressure exerted thereon by said bushing.

2. The combination, as defined in claim 1, in which there is a clearance of the order of .002 inch between the bore of the bushing and the shaft.

FRANK ZIHERL.

REFERENCES CITED

The following references are of record in the file of this patent:

UNITED STATES PATENTS

| Number | Name | Date |
|---|---|---|
| 1,313,202 | Muston | Aug. 12, 1919 |
| 2,291,248 | Myers | July 28, 1942 |
| 2,309,446 | Ekkebus | Jan. 26, 1943 |
| 2,462,901 | Robison | Mar. 1, 1949 |

FOREIGN PATENTS

| Number | Country | Date |
|---|---|---|
| 252,407 | Great Britain | of 1926 |